(No Model.)  2 Sheets—Sheet 1.
F. M. BURGER.
POTATO DIGGER.
No. 408,208.  Patented Aug. 6, 1889.
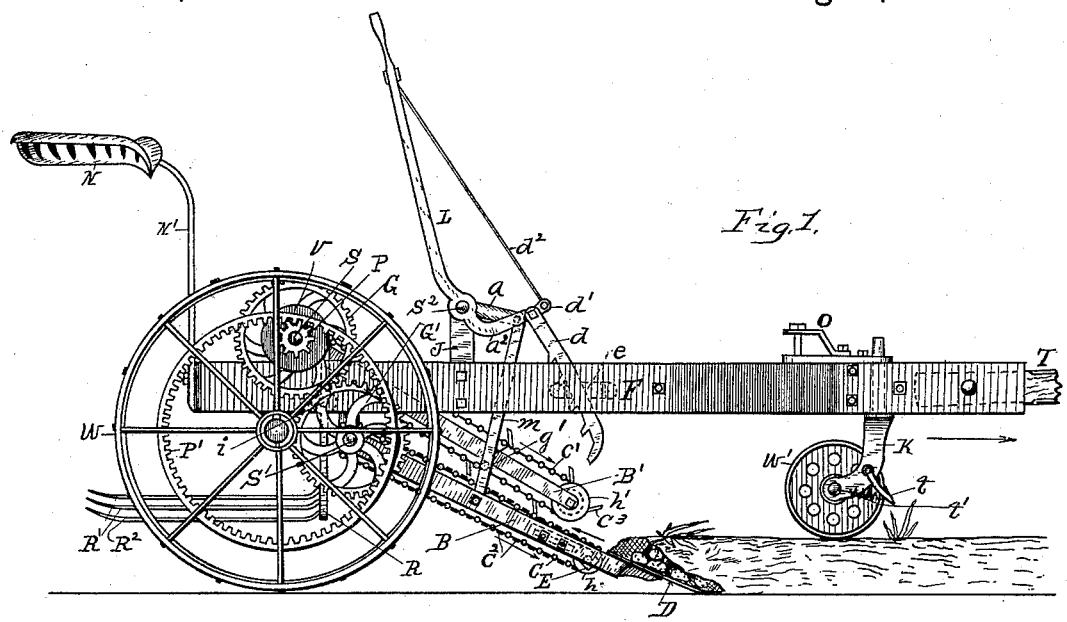
Witnesses.
Edwd M Bray
Daniel P Lemon
Inventor.
Frank M. Burger By
Thos H Hutchins Atty (No Model.) 2 Sheets—Sheet 2.
F. M. BURGER.
POTATO DIGGER.
No. 408,208. Patented Aug. 6, 1889.
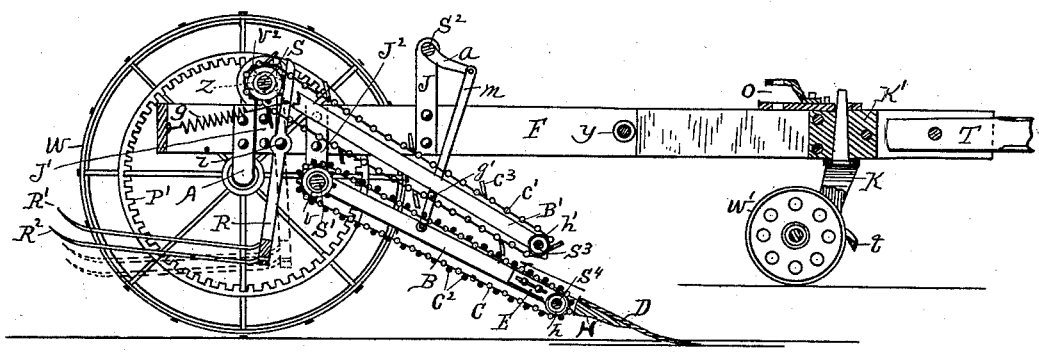
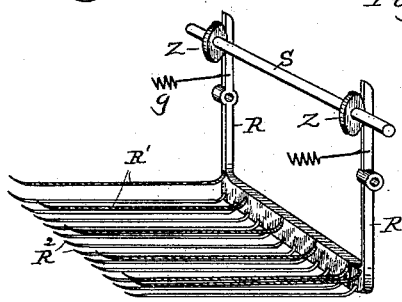
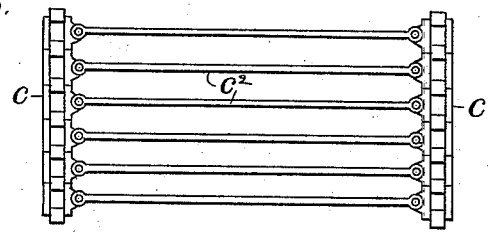
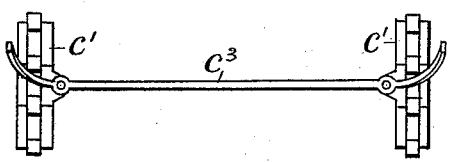
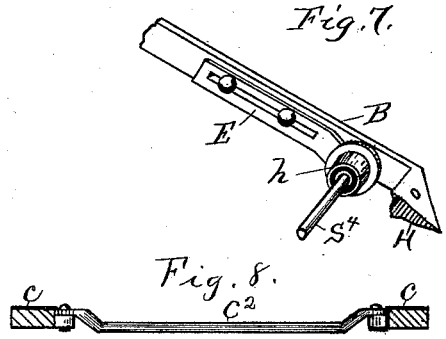
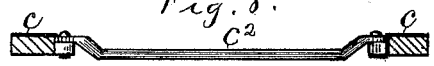
Witnesses.
Edwd M Bray
Daniel P. Lemon
Inventor.
Frank M. Burger By
Thos H Hutchins atty
N. PETERS, Photo-Lithographer, Washington, D. C.

UNITED STATES PATENT OFFICE.

FRANK M. BURGER, OF JOLIET, ILLINOIS.

POTATO-DIGGER.

SPECIFICATION forming part of Letters Patent No. 408,208, dated August 6, 1889.

Application filed March 25, 1889. Serial No. 304,586. (No model.)

*To all whom it may concern:*

Be it known that I, FRANK M. BURGER, a citizen of the United States of America, residing at Joliet, in the county of Will and State of Illinois, have invented certain new and useful Improvements in Potato-Diggers, of which the following is a specification, reference being had therein to the accompanying drawings and the letters and figures of reference thereon, forming a part of this specification, in which—

Figure 1 is a side elevation of the potato-digger as it would appear ready for operation in the field. Fig. 2 is a top plan view of the same. Fig. 3 is a central vertical longitudinal section of the same. Fig. 4 is a perspective view of the "shaker" for use at the rear of the machine. Fig. 5 is a plan view of a section of the endless carrier of the machine for conveying the potatoes and other material to the shaker at the rear of the machine. Fig. 6 is a plan view of a section of the upper endless carrier for conveying rearward accumulated vines or grass to the shaker at the rear of the machine. Fig. 7 is a perspective view of a section of the lower endless carrier-frame at its forward end where it connects with the plow and a perspective view of one of the sliding boxes supporting the lower shaft of said carrier, showing the means for regulating the tension of said carrier; and Fig. 8 is a side view of one of the cross-bars of the lower endless carrier, showing its central part depressed, so its ends will prevent material thereon from falling over the sides of the carrier.

This invention relates to certain improvements in machines for digging potatoes, and is of the class designed to be drawn by a team and plow up the row of potatoes and separate them from the dirt and vines and leave them in sight ready to be gathered.

Referring to the drawings, F represents the main frame of the machine, in form as is shown in Fig. 1. Its forward end is connected by a tie-rod Y and converges, so a tongue T can be hinged thereto and supported at its forward end on a caster-wheel W', the pintle of which enters a box K', and having a scraper $t$ hinged to its frame and held to its work on the periphery of said caster-wheel by means of a coil-spring connecting it with the axle $t'$ of said caster-wheel. The rear end of said main frame is supported at either side by means of the traveling wheels W W, arranged, respectively, on stub-axles A, secured to the sides of said frame.

S is a cross-shaft arranged across the top of the main frame in proper boxes at each end, secured to said frame and a little forward of the axles of said traveling wheels. Said shaft is provided at each end with a clutch V V, of the ordinary pattern, each having an outwardly-extending pinion P P, that mesh, respectively, with the internal gears P' P' of said traveling wheels, by means of which connection said shaft is driven when the machine travels forward and is not driven when the machine moves backward. Said shaft S has fixed on one end, next its clutch, a gear G, which meshes with a similar gear G', fixed on one end of a cross-shaft S', arranged below the main frame in suitable boxes $J^2$, secured to said main frame and a little forward of said shaft S, by means of which gear-connection the said shaft S drives shaft S'.

B' B' are a pair of parallel bars having their upper ends boxed on shaft S next its boxes, and connected at their lower ends by means of a cross-shaft $S^3$, properly boxed at its ends in said bars, respectively. Said cross-shaft $S^3$ is provided at either end with sprocket-wheels $h'$ $h'$, and shaft S is provided with corresponding sprocket-wheels $V^2$ $V^2$, arranged in line with those on shaft $S^3$. Said sprocket-wheels carry the endless sprocket-chains C' C'. These sprocket-chains C' C' are connected at intervals with parallel cross-bars $C^3$, properly secured thereto, which cross-bars have their ends extend in a curved upward direction from said chains and at such angle therewith as to be about perpendicular with the ground, so they will more readily disengage from vines and grass in depositing them on the shaker.

B B are a pair of similar parallel bars to those shown at B' B', and are boxed, respectively, at their upper ends on shaft S', near either end at the side of its boxes, and are connected at their lower ends by an integral cross-plate H, to which is securely bolted the plow D.

S⁴ is a cross-shaft arranged between said parallel bars B B, immediately in the rear of said plow in sliding boxes E E, adjustably secured to said bars. Said shaft S⁴ is provided with pulleys $h\ h$ at each end, and shaft S', to which said parallel bars B B are boxed, is provided with sprocket-wheels V V, arranged in line with said pulleys. Said sprocket-wheels and pulleys carry the endless sprocket-chains C C. These sprocket-chains are connected at short intervals with the parallel cross-bars C², properly secured thereto, and near enough together to prevent potatoes of any size from falling through between them. These cross-bars are depressed at their central part, as shown in Fig. 8, so as to prevent material from falling over the sides of the endless carrier formed of said cross-bars and sprocket-chains C C.

S² is a cross rock-shaft arranged above the main frame in proper boxes in standards J J, secured to said frame about central over said carriers. Said shaft is provided at each end next its boxes with forwardly-projecting arms $a\ a$. The outer ends of said arms are respectively connected by means of the links M M with the side bars B B of the lower carrier.

L is a hand-lever secured on shaft S² for rotating it to elevate and lower the forward ends of the endless carriers and plow D through the medium of their connection with said shaft. The lower end of said hand-lever terminates in a forwardly-extending arm $a^2$, to the outer end of which is pivotally secured a ratchet-pawl $d$, the ratchet-teeth of which engage, respectively, a rest $e$, secured on the side of the frame F. The upper end of said ratchet-pawl has pivoted to it at one side the upwardly-extending rod $d'$, connected with a hand-latch (hidden by the upper end of said lever) for disengaging said pawl from its rest $e$ when it is desired to lower the endless carriers.

The angle or pitch of the carriers and plow is regulated by means of supporting the outer ends of said arms at any desired height by means of said ratchet-pawl resting on any one of its ratchet-teeth on its rest $e$.

The forward end of the upper carrier is supported by means of its side bars B' B', resting on pins or supports $g'$, adjustably secured to the sides of the links $m\ m$ in such manner that the two carriers are about parallel, but so that the forward end of the upper carrier is left free to be elevated and lowered by means of material being carried up between the two carriers.

R R are a pair of vertically-arranged bars, connected at their lower ends by an integral cross-bar provided with two rows of rearwardly-extending teeth R' and R², turned up slightly at their extending ends, and the teeth R' in the upper row being less in number than teeth R² in the lower row. Said bars R R are respectively secured to the inner sides of the main frame, immediately in the rear of the lower carrier, so that said carrier will discharge its contents on said teeth. The upper extending ends of said bars R R pass shaft S on its forward side, so as to engage, respectively, the cam-wheels Z Z, secured on said shaft, and held in contact therewith by means of the coil-springs $g$, connecting said bars with the rear part of the main frame, so that when said shaft S rotates said teeth R' R² will be caused to have a tossing motion and operate as a shaker to separate the vines, grass, and dirt from the potatoes, which will drop to the ground between said teeth and over their extending ends. The upper row of teeth R' are intended to catch the vines, grass, and coarser material and prevent their falling on the lower teeth, so that the lower teeth may operate better on the finer dirt to sift it from the potatoes; and hence the upper row of teeth are arranged farther apart than the lower ones.

In operation a team is hitched to whiffletrees secured to a doubletree held at O. As the machine advances, the plow runs under a row of potatoes, which, with the dirt and vines covering them, are carried up between the two endless carriers and all deposited on the teeth of the shaker, where all dirt and material that have not been removed from the potatoes by falling through the lower endless carrier are shaken out and separated from the potatoes by means of said teeth of said shaker and the potatoes left on the surface of the ground ready to be picked up.

Having thus described my invention, what I claim as new, and desire to secure by Letters Patent, is as follows, to wit:

1. The potato-digger shown and described, consisting of the combination, with the main frame and its traveling wheels and the caster-wheel, of the lower endless carrier having its cross-bars arranged to be lower at their central part than at their ends, and having the plow secured to the forward part of its frame, the upper carrier arranged to be parallel with the lower carrier and having its forward end free to be elevated and lowered by material passing between the carriers, and having its cross-bars terminate in teeth or arms for engaging such material, and the shaker arranged at the rear of said carriers and to receive material therefrom, all arranged to operate substantially as and for the purpose set forth.

2. In the potato-digger shown and described, the lower endless carrier having its cross-bars arranged to be higher at each end than at their parts between their ends, in combination with the upper endless carrier having its cross-bars arranged wider apart than those of the lower carrier and extending at each end to form teeth or arms for engaging material between the carriers, the plow for delivering material to and between the carriers, and the means shown for driving and adjusting said carriers, substantially as and for the purpose set forth.

3. In the potato-digger shown and described, the combination, with the main frame, of the two endless carriers arranged to be parallel with each other and vertically adjustable at their forward ends, the lower carrier having a plow secured to its forward end and having its cross-bars formed to be lower at their central parts than at their ends, and the upper carrier having its cross-bars project to form teeth or arms to carry material along between the carriers to the rear of the machine, substantially as and for the purpose set forth.

4. In the potato-digger shown and described, and in combination with the endless carriers, the shaker consisting of the frame R and double row of teeth $R'$ $R^2$, the shaft S, cams Z Z, and coil-springs $g$ $g$, substantially as and for the purpose set forth.

5. In the potato-digger shown and described, in combination with the lower endless carrier having a plow secured to its forward end, the upper endless carrier, the rock-shaft $S'$, having the arms $a$ $a$ and $a^2$, ratchet-pawl $d$, and hand-lever L, and the links $m$ $m$, for connecting said arms $a$ $a$ and lower carrier and for supporting the forward end of the upper carrier, substantially as and for the purpose set forth.

FRANK M. BURGER.

Witnesses:
　THOS. H. HUTCHINS,
　K. C. HUTCHINS.